(No Model.) 2 Sheets—Sheet 1.
C. J. HARTMANN.
ELECTRODE FOR SECONDARY BATTERIES.
No. 422,301. Patented Feb. 25, 1890.
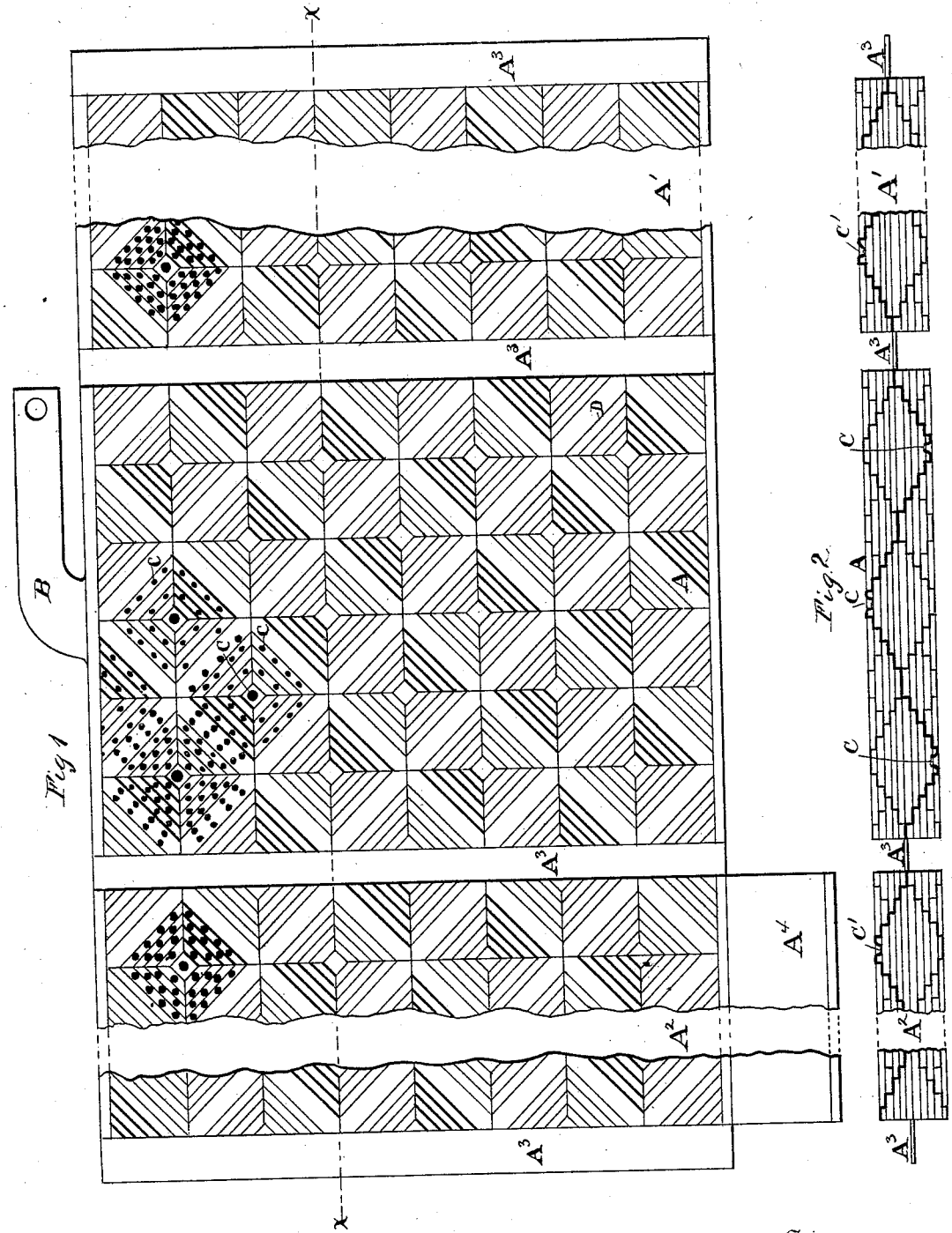
Witnesses
Jas. F. Warner
J. H. Hartstein
Inventor
Charles James Hartmann
By his Attorney
James M. Hicks (No Model.) 2 Sheets—Sheet 2.
C. J. HARTMANN.
ELECTRODE FOR SECONDARY BATTERIES.
No. 422,301. Patented Feb. 25, 1890.
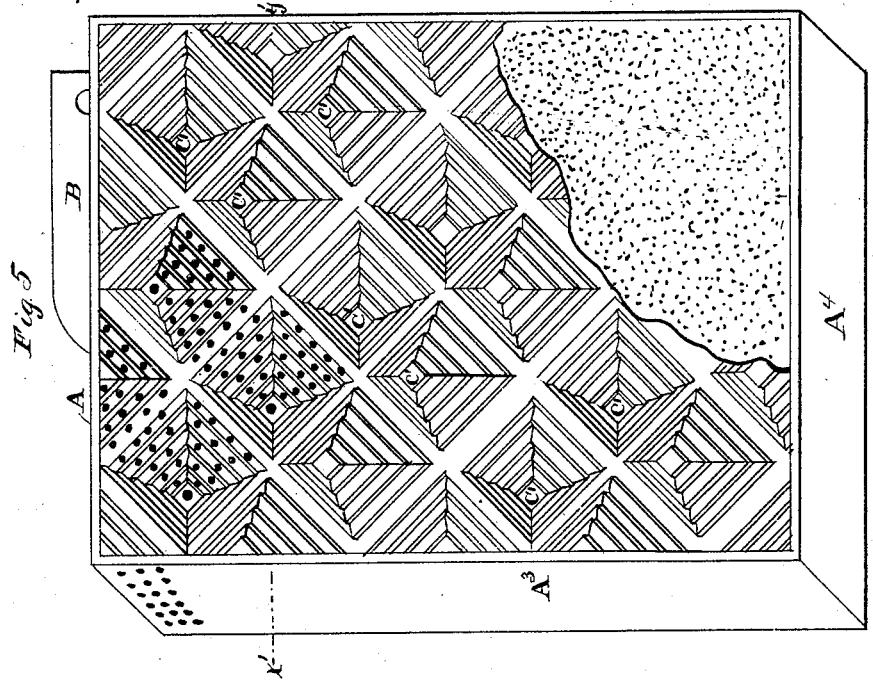
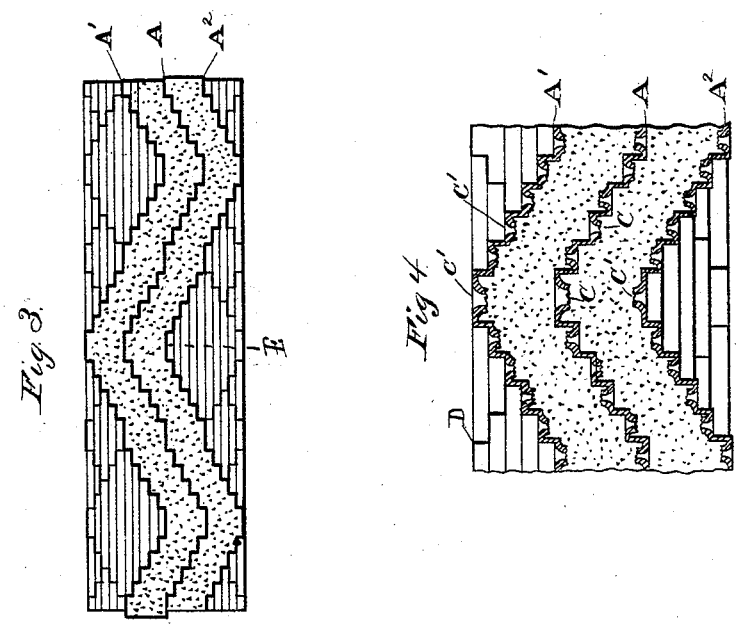
Witnesses
Jas. P. Warner
T. H. Hartst
Inventor
Charles James Hartmann
By his Attorney
James M. Hicks

UNITED STATES PATENT OFFICE.

CHARLES JAMES HARTMANN, OF SUMMIT, NEW JERSEY.

ELECTRODE FOR SECONDARY BATTERIES.

SPECIFICATION forming part of Letters Patent No. 422,301, dated February 25, 1890.

Application filed June 20, 1889. Serial No. 314,996. (No model.)

*To all whom it may concern:*

Be it known that I, CHARLES JAMES HART-MANN, a citizen of the United States of America, residing at Summit, county of Union, and State of New Jersey, have invented and made new and useful Improvements in Electrodes for Storage-Batteries; and I do hereby declare that the following is a full, clear, and exact description and specification of the same, reference being had to the drawings making part thereof.

The object of my invention is to provide an electrode for storage-batteries which by its construction exposes the largest amount of surface of active material to the battery-fluid in proportion to the amount of conductive material in the plates which sustain said active material, in order to obtain the greatest efficiency and storage capacity in proportion to the weight of the electrode and of the battery, and at the same time to avoid the falling away of the active material from the plates, and also to prevent the buckling and polarizing of the plates, and to simplify the method of manufacture and reduce the cost of the battery; and to this end my invention consists in certain elements and combinations of elements, fully set forth in and claimed at the end of this schedule.

In order that persons skilled in the art may understand, construct, and use my invention, I will proceed to describe it, referring to the drawings forming part of this specification, in which—

Figure 1 is a front elevation of my electrode before it is folded. The two plates A' and A² are shown broken. A few only of the pyramids are shown perforated for convenience of illustration. Fig. 2 is a horizontal section on line *x y* of Fig. 1. Fig. 3 is a horizontal section of Fig. 5 on line *x' y'*. Fig. 4 is an enlarged view, in section, of the pyramids in part. Fig. 5 is a perspective view of the whole electrode when folded. A portion is broken away to show the active material in place.

Fig. 1 shows my electrode before it is folded and after it has been cut and shaped from a thin sheet of conductive material, preferably of ordinary commercially-pure lead punched with flanged holes near together by forcing a tool through the plate, so as to stretch the material and form a burr around the hole or perforation, but not to remove any of the substance of the plate, as is ordinarily done. These holes or perforations are designed to permit a free circulation of the battery-fluids through them. In the main body of the plate A these flanged holes are made so that the flanged part or the burrs alternate in direction—one is directed to the right and the next one to the left side of the plate; but in the laps A' and A² the burrs are all in one direction in each lapping plate, so that when these laps are folded around the main body A these burrs in each lap will project inwardly toward the surface of the main plate A. These flanges or burrs around the perforations act as conducting edges or points, to more freely conduct the electricity to and from the active storage material located and held between them, and retain the active material in place. This view also shows the surface of the main plate A, formed into alternately raised and depressed diamonds or pyramids, quadrangular; but they may be made of any number of angles. The surfaces of these hollow pyramids are fluted crosswise to form sharp corners on the metal to aid the flow of electricity to and from the active storage material in contact therewith. The whole surface of this plate is not shown as perforated and formed into pyramids, but they will be in use.

Fig. 2 shows the perforations, the depressed pyramids, and the general form of the plates. Fig. 3 shows the laps A' and A² folded around the central portion A, so as to form spaces between for active material, the perforations and their flanges, and the manner in which the pyramids fit into each other. In these figures I have not shown the central conducting-plate surrounded by an incasing-plate, as shown in another application of even date, Serial No. 314,995; but such a construction may be used in lieu of the one shown herein. I have shown and described only the method of construction which I prefer to use. I have shown the flutes running at right angles to the perpendicular line of the pyramids; but the flutes may run so as to converge toward the apex of the pyramids.

A is the central portion of the conducting-plate.

A' is one flap, and A² is the other flap, which folds around the central portion A.

A³ are flat portions provided with inwardly-projecting flanged or burred perforations, which sides A³ form the ends of the lapping folds, and their widths determine the distance which separates the central portion of the plate A and portions A' and A².

A⁴ is the portion of plate A' which folds under all of the plates at the bottom.

B is the tongue or lug at the top of the electrode on plate A, by which the attachments to the other electrodes and conducting-wires is made. It extends to one side, as shown, starting from the center portion of plate A, so as to cause the electrical current to flow from and to all portions of the electrode evenly. It is a part of the plate itself. The portions A' and A² may also be provided with tongues to match the tongue or portion A; but it is not essential. C and C' are the flanged or burred perforations in plates A A' and A² A³, respectively. They alternate in direction in plate A; but in the plates A', A², and A³ they are flanged inwardly toward the central part A. These flanges prevent the storage material from falling out and increase the active conducting-surface and the surface of the active storage material in contact therewith and present conducting-points and sharp edges to facilitate the electric flow to and from the active storage material.

D are the flutes on the surfaces of the plates, shown as formed in squares; but they may take any other form and direction.

E are the hollow pyramids, fluted and perforated with flanged edges or burrs. These pyramids are shown as quadrangular; but they may be formed by any other angles into triangular, hexagonal, or octagonal figures. They are pressed into the thin conductive material of which the electrode is made, alternating with each other in direction—that is to say, the apex of one pyramid is on one side of the thin plate and the next one is on the other side—and are so located in the several parts of the plate of which the electrode is composed that when the parts A' and A² are folded around upon the part A that the apex of one pyramid will enter the depression of another, separated a sufficient distance to allow storage material to lie between their surfaces. Larger holes or perforations are made in the apex of each hollow pyramid in the portions A' and A² than in the other parts of the plates which form the electrode. I have spoken of the portions of the electrode A A' A² A³ A⁴ as separate plates for the convenience of expression; but they are parts only of the same plate, although in some cases they may be merely incasing-plates, held in the respective positions and relations to each other by suitable fastenings.

For my active material I use either a dry powder or a spongy mass, as may be convenient.

By means of the hollow pyramids, flutes, flanged and burred perforations I cause the surfaces of the conducting-plates to approach as closely as possible to every portion of the active storage material. I increase the amount of active material in use. I hold it all firmly in place, and I facilitate the flow of the electricity to and from the storage material, cheapen the cost of manufacture, and provide a battery of the greatest efficiency and durability.

These electrodes thus constructed are assembled in a battery glass or receptacle connected to the electrical circuit and operated in the usual manner.

The several figures in the drawings are not made to state, but are drawn merely to illustrate, the principle of my invention.

Having now fully described my invention and the manner in which I have embodied it, what I claim as new, and desire to secure by Letters Patent, is—

1. An electrode for storage-batteries, consisting of the three plates A, A', and A², each plate constructed with diamond or pyramidal depressions, and provided with blanks A³, located between said plates A, A', and A², and arranged to fold the one upon the other, substantially as specified.

2. In an electrode for storage-batteries, the plates A, A', and A², constructed with fluted or furrowed diamond or pyramidal depressions, substantially as specified.

3. In an electrode for storage-batteries, the plates A, A', and A², constructed with fluted or furrowed diamond or pyramidal depressions and with burred or flanged perforations, substantially as specified.

4. An electrode for storage-batteries, consisting of three plates constructed with the lug B, extending from the central portion of the top of central plate A to its outer edge, substantially as shown and described.

5. In an electrode for storage-batteries, the conducting-plate constructed with the central portion A, the end folds A³, the flaps A' and A², and the bottom fold A⁴, arranged, as shown, to be folded upon the central portion A, so as to leave a space between for active material, and the lug B, substantially as shown and described.

6. In an electrode for storage-batteries, the conducting-plate, substantially as shown and described, consisting of the central portion A, and flaps A' and A², the end folds A³ and A⁴, and the lug B, the portions A, A', and A² being covered with depressed fluted pyramids and provided with flanged perforations, substantially as and for the purposes hereinbefore specified.

7. An electrode for storage-batteries, consisting of the conducting-plate constructed with side flaps A' and A² and arranged to fold around a central portion A, for the purpose of securing active material between their surfaces, and perforated and formed into diamond or pyramidal depressions, substantially as and the purposes set forth.

8. An electrode for storage-batteries, consisting of a conducting-plate constructed with pyramidal or diamond shaped depressions alternating in direction and arranged to fold one upon the other, so that the apex of one pyramid or diamond coincides with and enters the depression of another pyramid or diamond opposite it and retains active material between their surfaces, substantially as specified, and for the purposes set forth.

9. An electrode for storage-batteries, consisting of a central conducting-plate A and the side flaps A' and A², constructed with flutes and arranged to fold the one upon the other, substantially as and for the purposes specified.

10. An electrode for storage-batteries, consisting of a central conducting-plate A and side flaps A' and A², constructed with flanged or burred perforations, substantially as and for the purposes specified.

11. An electrode for storage-batteries, consisting of the central plate A, side flaps A' and A², constructed with flutes, and flanged perforations and flutes, substantially as and for the purposes specified.

CHARLES JAMES HARTMANN.

Witnesses:
WM. HUTCHISON,
J. O. H. CLARK.